US012660816B2

(12) United States Patent
Sada

(10) Patent No.: US 12,660,816 B2
(45) Date of Patent: Jun. 23, 2026

(54) METHOD FOR CONTROLLING WEEDS

(71) Applicant: SUMITOMO CHEMICAL COMPANY, LIMITED, Chuo-ku (JP)

(72) Inventor: Yoshinao Sada, Kasai (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 455 days.

(21) Appl. No.: 17/906,943

(22) PCT Filed: Mar. 29, 2021

(86) PCT No.: PCT/JP2021/013305
§ 371 (c)(1),
(2) Date: Sep. 21, 2022

(87) PCT Pub. No.: WO2021/200825
PCT Pub. Date: Oct. 7, 2021

(65) Prior Publication Data
US 2023/0142963 A1 May 11, 2023

(30) Foreign Application Priority Data
Mar. 31, 2020 (JP) ................................. 2020-062400

(51) Int. Cl.
*A01N 35/06* (2006.01)
*A01P 13/02* (2006.01)

(52) U.S. Cl.
CPC .............. *A01N 35/06* (2013.01); *A01P 13/02* (2021.08)

(58) Field of Classification Search
CPC ................................. A01N 35/06; A01P 13/02
See application file for complete search history.

(56) References Cited

U.S. PATENT DOCUMENTS

| | | |
|---|---|---|
| 4,741,768 A | 5/1988 | Frazier et al. |
| 6,239,072 B1 | 5/2001 | Flint et al. |
| 8,748,700 B2 | 6/2014 | Hanger et al. |

FOREIGN PATENT DOCUMENTS

| | | |
|---|---|---|
| JP | 2019-172687 A | 10/2019 |
| WO | WO 2020/017667 A2 | 1/2020 |

OTHER PUBLICATIONS

Australian Government, The Biology of *Zea mays* L. ssp mays (maize or corn), Sep. 2008, Office of the Gene Technology Regulator, 81 pages. (Year: 2008).*
US EPA, Notification: Per PR-Notice 2007-4, United States Environmental Protection Agency, 2014, 52 pages. (Year: 2014).*
International Search Report issued Jun. 15, 2021 in PCT/JP2021/013305 (with English translation), 5 pages.
International Preliminary Report on Patentability and Written Opinion issued Sep. 29, 2022 in PCT/JP2021/013305 (with English translation), 8 pages.
Mcwhorter, C.G., et al. "Spot Spraying for Johnsongrass (*Sorghum balepense*) Control in Soybeans (*Glycine max*)" Weed Science, vol. 27, Issue 1 Jan. 1979, pp. 119-121.
Chang, Y.K., et al., "Sensing System Using Digital Photography Technique for Spot-Application of Herbicide in Pruned Wild Blueberry Fields", Applied Engineering in Agriculture, vol. 30(2), 2014, pp. 143-152.
農薬抄録 アリスタ ライフサ イエンス株式会社 Oct. 21, 2016, Retrieved from the internet: https://www.acis.famic.go.jp/syouroku/clethodim/clethodim_01.pdf, retrieved on May 27, 2021, pp. 18-19, column "IV. Scope of applicable pests and usage", non-official translation ("Abstract of chemical abstract", Arysta Lifescience Corporation) (with English translation).
"Tapout Selective Grass Herbicide", Helena Chemical Company, No. 50805, Nov. 16, 2010, 49 pages.
"The Biology of *Zea mays* L. ssp mays (maize or corn)" Australian Government, Office of the Gene Technology Regulator, Sep. 2008, 75 pages.

* cited by examiner

*Primary Examiner* — Trevor Love
(74) *Attorney, Agent, or Firm* — Oblon, McClelland, Maier & Neustadt, L.L.P.

(57) ABSTRACT

The present invention provides a method which exerts excellent control effect in controlling weeds. The method for controlling weeds, which comprises a step of performing a spot treatment of clethodim in a cultivation area of soybean, cotton, sugar beet, rapeseed or sunflower.

15 Claims, No Drawings

METHOD FOR CONTROLLING WEEDS

CROSS-REFERENCE TO RELATED APPLICATIONS

The present application is a 35 U.S.C. § 371 national stage patent application of International patent application PCT/JP2021/013305, filed on Mar. 29, 2021, which is based on and claims the benefits of priority to Japanese Application No. 2020-062400, filed on Mar. 31, 2020. The entire contents of these applications are incorporated herein by reference.

TECHNICAL FIELD

The present invention relates to a method for controlling weeds.

BACKGROUND ART

There has hitherto been known, as a method for controlling weeds in a soybean field, a cotton field, a sugar beet field, a rapeseed field and a sunflower field, a method for applying clethodim (Patent Documents 1 to 4). A spot treatment is used as an herbicide application method (Non-Patent Documents 1 and 2).

CITATION LIST

Patent Document

Patent Document 1: U.S. Pat. No. 6,537,948
Patent Document 2: U.S. Pat. No. 6,239,072
Patent Document 3: U.S. Pat. No. 8,748,700
Patent Document 4: WO 2020/017667

Non-Patent Document

Non-Patent Document 1: C. G. MCWHORTER and one other, "Weed Science", January 1979, Volume 27, Issue 1, p. 119-121
Non-Patent Document 2: Y. K. Chang and three others, "Applied Engineering in Agriculture", 2014, Volume 30 (2), p. 143-152

SUMMARY OF THE INVENTION

Problems to be Solved by Invention

An object of the present invention is to provide a method for exerting an excellent control effect in weed control.

Means to Solve Problems

The present inventor has found that an excellent control effect on weeds is exerted in the presence of soybean, cotton, sugar beet, rapeseed or sunflower by performing a spot treatment of clethodim.

The present invention includes the following [1] to [3].

[1] A method for controlling weeds, which comprises a step of performing a spot treatment of clethodim in a cultivation area of soybean, cotton, sugar beet, rapeseed or sunflower.

[2] The method according to [1], wherein clethodim is applied to at least 10% of an area of the cultivation area by the spot treatment.

[3] The method according to [1], wherein the weed is volunteer corn.

Effects of Invention

According to the method for controlling weeds of the present invention, it becomes possible to effectively control weeds.

MODE FOR CARRYING OUT THE INVENTION

The weed control method of the present invention (hereinafter sometimes referred to as the present method) includes a step of performing a spot treatment of clethodim in a cultivation area of soybean, cotton, sugar beet, rapeseed or sunflower.

Clethodim is a compound mentioned in U.S. Pat. No. 4,741,768 and can be produced by a known method. Commercially available products may also be used.

In the present method, a cultivation area of soybean, cotton, sugar beet, rapeseed and sunflower (hereinafter may also be referred to as "present crop") includes a place where the present crop is cultivated and a place where the present crop is to be cultivated.

In the method of the present invention, the spot treatment is the concept opposed to a uniform treatment of herbicides in blanket manner, and means a treatment in which the herbicide is selectively sprayed on the place where weeds are growing or may grow. The term "treatment for place" means a treatment for weeds or soil if weeds are growing, or a treatment for soil at the place where weeds may grow. The case where, clethodim is slightly sprayed on the place where weeds are not growing or may not grow by spray drift or evaporation, is also included in the spot treatment unless it is a uniform blanket treatment. Only the case where, all the places where weeds are growing or may grow are selectively treated in a continuous cultivation field of the present crops, is not considered as the spot treatment. In other words, even if a part of the cultivation field is treated in a blanket manner, or a part of the place where weeds are growing or may grow is not treated with clethodim, the treatment is included in the spot treatment if a spot-treated place is present in the continuous cultivation field of the present crops. The spot treatment can be performed while avoiding the present crops, or can be applied based only on the location of weeds, independent of the location of the present crops.

Specific examples of the method for spot treatment are shown below. The spot treatment can be performed as follows: in the cultivation field of the present crops, a spraying person visually sprays clethodim using a handheld nozzle or a robotic arm nozzle while walking or riding on a device running on the ground or a flying device. The spot treatment can also be performed by mapping the place where weeds are growing or may grow in advance, and spraying clethodim based on map information. In spraying based on map information, the spot treatment can be performed by, in addition to the aforementioned method, automatically or manually opening and closing the nozzle on the boom or the robotic arm nozzle while running or flying of a spraying machine, based on location information of the spraying machine (obtained by GPS) and the map information. The map information can be created based on image information taken by a manned or unmanned flying object, or the map information can be created visually by an observer walking on the ground, an observer riding on a device running on the ground, or an observer riding on a flying device. Furthermore, the running or flying spraying machine has a function to detect the place where weeds are growing or may grow, and the spot treatment can be performed by the boom or robotic arm while performing real-time mapping. These technologies are mentioned in Patent Documents (e.g., WO 2018001893, WO 2018036909, WO 2021034775) and Non-Patent Documents (e.g., Crop Protection 26, 270-277, Weed Technology 17, 711-717, Applied Engineering in Agriculture. 30, 143-152). These technologies correspond to a form of emerging agriculture called precision agriculture, smart agriculture or digital agriculture, and the non-uniform spray style generated by the spot treatment is also called variable rate application (VRA) as the term in the emerging agriculture. The technology in which a running spraying machine performs the spot treatment in real time while detecting growing weeds is also known as "See & Spray" or "optical spot spray technology (OSST)".

The place where weeds may grow can be estimated based on the fact that the weeds formed a vegetation batch in the past growing season, or it can be estimated from the distribution of buried seeds. The distribution of buried seeds can be examined by soil sampling or estimated by remote sensing.

In the present crop, variations within each crop species are not particularly limited. The soybean may be of any maturity group (maturity group I-X) such as early to late maturing, may be of any growth habit (indeterminate, determinate, and semi-determinate), may be of any growth type (vining and bush types), or may have any seed coat color (pale orange, black, green, and brown). Any of the above soybeans may be an edamame variety or a shoot-harvested variety, and it is desirable that the soybean be a grain harvesting type in which dry-ripened seeds are harvested. The cotton may be pima cotton or the like, and is desirably upland cotton. The sugar beet may be sugar beet for feeds, rood vegetables, leafy vegetables (chards) or fuels, and it is desirable for sugar production. The rapeseed may be non-canola variety, and is desirably a canola variety, and each may be winter habit, and is desirably spring habit. The sunflower is sunflower for edible or ornamental purpose, and is desirably sunflower for oil extraction.

The present crops of the variety mentioned above may be a plant which can be produced by natural hybridization, a plant which can occur as the result of a mutation, an F1 hybrid plant, or a transgenic plant (also referred to as a "genetically modified plant"). These plants generally have properties such as a property that the tolerance to a herbicide is imparted, a property that a toxic substance against pests is accumulated, a property that the sensitivity to a plant disease is suppressed, a property that yield potential is increased, a property that the resistance to a biological or non-biological stress factor is improved, a property that a substance is accumulated, and improvement in a storage property or processability.

The term "F1 hybrid plant" refers to a plant of a first filial generation which is produced by hybridizing two different varieties with each other, and is generally a plant which has a more superior trait to that of either one of parents thereof, i.e., has a hybrid vigor property.

The term "transgenic plant" refers to a plant in which a foreign gene from another organism such as a microorganism is introduced, and has a property that cannot be acquired easily by hybridization breeding, induction of a mutation or a naturally occurring recombination under a natural environment.

Examples of the technique for producing the above-mentioned plants include a conventional breeding technique, a transgenic technique, a genome-based breeding technique, a new breeding technique, and a genome editing technique. The conventional breeding technique is a technique for producing a plant having a desirable property by mutation or hybridization. The transgenic technique is a technique for imparting a new property to a specific organism (e.g., a microorganism) by isolating a gene (DNA) of interest from the organism and then introducing the gene (DNA) into the genome of another target organism, and an antisense technique or an RNA interference technique which is a technique for imparting a new or improved property to a plant by silencing another gene occurring in the plant. The genome-based breeding technique is a technique for increasing the efficiency of breeding using genomic information, and includes a DNA marker (also referred to as "genome marker" or "gene marker") breeding technique and genomic selection. For example, the DNA marker breeding is a method in which an offspring having a desired useful trait gene is selected from many hybrid off springs using a DNA marker that is a DNA sequence capable of serving as an indicator of the position of a specific useful trait gene on a genome. The analysis of a hybrid offspring of a plant at a seedling stage thereof using the DNA marker has such a characteristic that it becomes possible to shorten the time required for breeding effectively.

The genomic selection is such a technique that a prediction equation is produced from a phenotype and genomic information both obtained in advance and then a property is predicted from the prediction equation and the genomic information without carrying out the evaluation of the phenotype. The genomic selection can contribute to the increase in efficiency of breeding. A "new breeding technique" is a collective term for combinations of breeding techniques including molecular biological techniques. Examples of the new breeding technique include techniques such as cisgenesis/intragenesis, oligonucleotide-directed mutagenesis, RNA-dependent DNA methylation, genome editing, grafting to a GM rootstock or scion, reverse breeding, agroinfiltration, and seed production technology (SPT). The genome editing technique is a technique that converts genetic information in a sequence-specific manner, and enables deletion of a base sequence, substitution of an amino acid sequence, introduction of a foreign gene and the like. Examples of the tool for the technique include zinc-finger nuclease (ZFN), TALEN, CRISPR/Cas9, CRISPER/Cpf1 and meganuclease which can cleave DNA in a sequence-specific manner, and a sequence-specific genome modification technique using CAS9 nickase, Target-AID and the like which is produced by any one of the modification of the above-mentioned tools.

Examples of the above-mentioned plants include plants listed in genetically modified crops registration database (GM APPROVAL DATABASE) in an electric information site in INTERNATIONAL SERVICE for the ACQUISITION of AGRI-BIOTECH APPLICATIONS, ISAAA) (http://www.isaaa.org/). More specific examples of the plants include a herbicide-tolerant plant, a pest-tolerant plant, a plant disease-tolerant plant, a plant of which the quality (e.g., the increase or decrease in content or the change in composition) of a product (e.g., starch, amino acid, fatty acid, etc.) is modified, a fertility trait modified plant, a non-biological stress-tolerant plant or a plant of which a trait associated with growth or yield is modified.

Examples of the plant imparted with tolerance to herbicides are mentioned below.

The mechanism of the tolerance to a herbicide can be obtained by reduction of the affinity of a chemical for a target, rapid metabolism (e.g., decomposition, modification)

of the chemical as the result of the expression of an enzyme capable of inactivating the chemical, or inhibition of the migration of the chemical in the body of the plant.

The plant imparted with tolerance to a herbicide by a transgenic technique also includes plants each, by a transgenic technique, imparted with the tolerance to: a 4-hydroxyphenylpyruvate dioxygenase (hereinafter abbreviated as "HPPD") inhibitor such as isoxaflutole and mesotrione; an acetolactate synthase (hereinafter abbreviated as "ALS") inhibitor such as an imidazolinone-type herbicide including imazethapyr and a sulfonylurea-type herbicide including thifensulfuron-methyl; a 5-enolpyruvylshikimate-3-phosphate synthase (hereinafter abbreviated as "EPSPS") inhibitor such as glyphosate; a glutamine synthase inhibitor such as glufosinate; an auxin-type herbicide such as 2,4-D; an oxynil-type herbicide including bromoxynil; or protoporphyrinogen oxidase (hereinafter abbreviated as PPO) inhibitors such as flumioxazin.

Hereinbelow, specific examples of the herbicide-tolerant plant will be mentioned, but for corn, this is for cultivated corn which is the source of the volunteer corn mentioned below.

Plants tolerant to glyphosate herbicides; produced by introducing at least one of a glyphosate-tolerant EPSPS gene originated from *Agrobacterium tumefaciens* strain CP4 (CP4 epsps), a glyphosate-metabolizing enzyme gene in which metabolic activity is enhanced by a shuffling technique for a glyphosate-metabolizing enzyme (glyphosate N-acetyltransferase) gene originated from *Bacillus licheniformis* (gat4601, gat4621), a glyphosate-metabolizing enzyme originated from *Ochrobacterum anthropi* strain LBAA (glyphosate oxidase gene, goxv247) or an EPSP gene originated from corn and having a glyphosate tolerance mutation (mepsps, 2mepsps). Examples of the major plant include alfalfa (*Medicago sativa*), Argentina canola (*Brassica napus*), cotton (*Gossypium hirsutum* L.), creeping bentgrass (*Agrostis stolonifera*), corn (*Zea mays* L.), polish canola (*Brassica rapa*), potato (*Solanum tuberosum* L.), soybean (*Glycine max* L.), sugar beet (*Beta vulgaris*) and wheat (*Triticum aestivum*). Some of the glyphosate-tolerant transgenic plants are commercially available. For example, a genetically modified plant which expresses glyphosate-tolerant EPSPS originated from Agrobacterium is commercially available by trade names including the trademark of "Roundup Ready (registered trademark)"; a genetically modified plant which expresses a glyphosate-metabolizing enzyme originated from Bacillus in which metabolic activity is enhanced by a shuffling technique is commercially available by the trade names of "Optimum (registered trademark) GAT (trademark)", "Optimum (registered trademark) Gly canola" and the like; and a genetically modified plant which expresses EPSPS having a glyphosate tolerance mutation originated from corn is commercially available by the trademark of "GlyTol (trademark)".

Plants tolerant to glufosinate herbicides; produced by introducing at least one of a gene (bar) for phosphinothricin N-acetyltransferase (PAT) which is a glufosinate-metabolizing enzyme originated from *Streptomyces hygroscopicus*, a gene (pat) for a phosphinothricin N-acetyltransferase (PAT) enzyme which is a glufosinate-metabolizing enzyme originated from *Streptomyces viridochromogenes* or a synthetic pat gene (pat syn) originated from *Streptomyces viridochromogenes* strain Tu494. Examples of the major plant include Argentina canola (*Brassica napus*), chicory (*Cichorium intybus*), cotton (*Gossypium hirsutum* L.), corn (*Zea mays* L.), polish canola (*Brassica rapa*), rice (*Oryza sativa* L.), soybean (*Glycine max* L.) and sugar beet (*Beta vulgaris*).

Some of the glufosinate-tolerant genetically modified plants are commercially available. The glufosinate-metabolizing enzyme (bar) originated from *Streptomyces hygroscopicus* and a genetically modified plant originated from *Streptomyces viridochromogenes* are commercially available by the trade names such as "LibertyLink (trademark)", "InVigor (trademark)" and "WideStrike (trademark)". Plants tolerant to oxynil-type herbicides (e.g., bromoxynil); includes transgenic plants tolerant to oxynil-type herbicides, for example, bromoxynil, into which a nitrilase gene (bxn) which is an oxynil-type herbicide (e.g., bromoxynil)-metabolizing enzyme originated from *Klebsiella pneumoniae* subsp. Examples of the major plant include Argentina Canola (*Brassica napus*), cotton (*Gossypium hirsutum* L.) and tobacco (*Nicotiana tabacum* L.), which are commercially available by the trade names such as "Navigator (trademark) canola" or "BXN (trademark)". Plants tolerant to ALS herbicides; carnation (*Dianthus* caryophyllus) having, introduced therein, an ALS herbicide-tolerant ALS gene (surB) originated from tobacco (*Nicotiana tabacum*) as a selection marker is commercially available by the trade names of "Moondust (trademark)", "Moonshadow (trademark)", "Moonshade (trademark)", "Moonlite (trademark)", "Moonaqua (trademark)", "Moonvista (trademark)", "Moonique (trademark)", "Moonpearl (trademark)", "Moonberry (trademark)" and "Moonvelvet (trademark)"; lineseed (*Linum usitatissumum* L.) having, introduced therein, an ALS herbicide-tolerant ALS gene (als) originated from mouse-ear cress (*Arabidopsis thaliana*) is commercially available by the trademark of "CDC Triffid Flax"; corn (*Zea mays* L.) having tolerance to a sulfonylurea-type herbicide and an imidazolinone-type herbicide and having, introduced therein, an ALS herbicide-tolerant ALS gene (zm-hra) originated from corn is commercially available by the trademark of "Optimum (trademark) GAT (trademark)"; soybean having tolerance to an imidazolinone-type herbicide and having, introduced therein, an ALS herbicide-tolerant ALS gene (csr1-2) originated from mouse-ear cress is commercially available by the trademark of "Cultivance"; and soybean having tolerance to a sulfonylurea-type herbicide and having, introduced therein, an ALS herbicide-tolerant ALS gene (gm-hra) originated from soybean (*Glycine max*) is commercially available by the trade names of "Treus (trademark)", "Plenish (trademark)" and "Optimum GAT (trademark)". Cotton having, introduced therein, an ALS herbicide-tolerant ALS gene (S4-HrA) originated from tobacco (*Nicotiana tabacum* cv. Xanthi) can also be mentioned. Plants tolerant to HPPD herbicides; soybean into which a mesotrione-tolerant HPPD gene (avhppd-03) originated from oat (*Avena sativa*) and a mesotrione-tolerant gene (pat) for a phosphinothricin N-acetyltransferase (PAT) enzyme which is a glufosinate-metabolizing enzyme originated from *Streptomyces viridochromogenes* are simultaneously introduced is commercially available by the trademark of "Herbicide-tolerant Soybean line".

Plants tolerant to 2,4-D; corn having, introduced therein, an aryloxyalkanoate dioxygenase gene (aad-1) which is a 2,4-D-metabolizing enzyme originated from *Sphingobium herbicidovorans* is commercially available by the trademark of "Enlist (trademark) Maize". Soybean and cotton having, introduced therein, an aryloxyalkanoate dioxygenase gene (aad-12) which is a 2,4-D-metabolizing enzyme originated from Delftia *acidovorans* are commercially available by the trademark of "Enlist (trademark) Soybean".

Plants tolerant to dicamba; includes soybean and cotton having, introduced therein, a dicamba monooxygenase gene (dmo) which is a dicamba-metabolizing enzyme originated from *Stenotrophomonas maltophilia* strain DI-6. Soybean (*Glycine max* L.) into which a glyphosate-tolerant EPSPS gene (CP4 epsps) originated from *Agrobacterium tumefaciens* strain CP4 is also introduced simultaneously with the above-mentioned gene is commercially available as "Genuity (registered trademark) Roundup Ready (trademark) 2 Xtend (trademark)".

Plants tolerant to PPO inhibitor: Examples thereof include plants which are imparted with decreased affinity to the PPO inhibitor and ability to detoxicate/decompose the PPO inhibitor by cytochrome P450 monooxygenase by a transgenic technique. Examples thereof also may include plants to which both the protoporphyrinogen oxidase and the cytochrome P450 monooxygenase are imparted. These plants are mentioned in, for example, Patent Documents such as WO 2011085221, WO 2012080975, WO 2014030090, WO 2015022640, WO 2015022636, WO 2015022639, WO 2015092706, WO 2016203377, WO 2017198859, WO 2018019860, WO 2018022777, WO 2017112589, WO 2017087672, WO 2017039969 and WO 2017023778 and Non-Patent Document (Pest Management Science, 61, 2005, 277-285).

Examples of a commercially available transgenic plant imparted with tolerance to herbicides include corn "Roundup Ready Corn", "Roundup Ready 2", "Agrisure GT", "Agrisure GT/CB/LL", "Agrisure GT/RW", "Agrisure 3000GT", "YieldGard VT Rootworm/RR2" and "YieldGard VT Triple" each having tolerance to glyphosate; soybean "Roundup Ready Soybean" and "Optimum GAT" each having tolerance to glyphosate; cotton "Roundup Ready Cotton" and "Roundup Ready Flex" each having tolerance to glyphosate; canola "Roundup Ready Canola" having tolerance to glyphosate; alfalfa "Roundup Ready Alfalfa" having tolerance to glyphosate and rice "Roundup Ready Rice" having tolerance to glyphosate; corn "Roundup Ready 2", "Liberty Link", "Herculex 1", "Herculex RW", "Herculex Xtra", "Agrisure GT/CB/LL", "Agrisure CB/LL/RW" and "Bt10" each having tolerance to glufosinate; cotton "FiberMax Liberty Link" having tolerance to glufosinate; rice "Liberty Link Rice" having tolerance to glufosinate; canola "in Vigor" having tolerance to glufosinate; rice "Liberty Link Rice" (Bayer product) having tolerance to glufosinate; cotton "BXN" having tolerance to bromoxynil; and canola "Navigator" and "Compass" having tolerance to bromoxynil. Other plants which are modified with respect to herbicides are also widely known, such as: alfalfa, apple, barley, eucalyptus, lineseed, grape, lentil, rapeseed, pea, potato, rice, sugar beet, sunflower, tobacco, tomato, turf grass and wheat each having tolerance to glyphosate (see, for example, U.S. Pat. Nos. 5,188,642, 4,940,835, 5,633, 435, 5,804,425 and 5,627,061); bean, cotton, soybean, pea, potato, sunflower, tomato, tobacco, corn, sorghum and sugarcane each having tolerance to dicamba (see, for example, WO 2008051633, U.S. Pat. Nos. 7,105,724 and 5,670,454); soybean, sugar beet, potato, tomato and tobacco each having tolerance to glufosinate (see, for example, U.S. Pat. Nos. 6,376,754, 5,646,024 and 5,561,236); cotton, peppers, apple, tomato, sunflower, tobacco, potato, corn, cucumber, wheat, soybean, sorghum and millets each having tolerance to 2,4-D (see, for example, U.S. Pat. Nos. 6,153,401, 6,100, 446, WO 2005107437, U.S. Pat. Nos. 5,608,147 and 5,670, 454); canola, corn, barnyard millet, barley, cotton, brown mustard, lettuce, lentil, melon, foxtail millet, oat, rapeseed, potato, rice, rye, sorghum, soybean, sugar beet, sunflower, tobacco, tomato and wheat each having tolerance to an ALS inhibitor (e.g., a sulfonylurea-type herbicide and an imidazolinone-type herbicide) (see, for example, U.S. Pat. No.

5,013,659, WO 2006060634, U.S. Pat. Nos. 4,761,373, 5,304,732, 6,211,438, 6,211,439 and 6,222,100) (particularly, rice having tolerance to an imidazolinone-type herbicide; rice having a specific mutation (e.g., S653N, S654K, A122T, S653 (At) N, S654 (At) K, A122 (At) T) in ALS and the like (see, for example, US 2003/0217381, WO 2005/20673)); barley, sugarcane, rice, corn, tobacco, soybean, cotton, rapeseed, sugar beet, wheat and potato each having tolerance to an HPPD herbicide (e.g., an isoxazole-type herbicide such as isoxaflutole; a triketone-type herbicide such as sulcotrione and mesotrione; a pyrazole-type herbicide such as pyrazolynate and diketonitrile that is a decomposition product of isoxaflutole (see, for example, WO 2004/055191, WO 199638567, WO 1997049816 and U.S. Pat. No. 6,791,014).

Examples of a plant that is imparted with tolerance to a herbicide by a classical breeding technique or genome-based breeding technique include: rice "Clearfield Rice", wheat "Clearfield Wheat", sunflower "Clearfield Sunflower", lentil "Clearfield lentils" and canola "Clearfield canola" (a product by manufactured by BASF) each having tolerance to an imidazolinone-type ALS inhibition-type herbicide such as imazethapyr and imazamox; soybean "STS soybean" having tolerance to a sulfonylurea-type ALS inhibition-type herbicide such as thifensulfuron-methyl; sethoxydim-tolerant corn "SR corn" and "Poast Protected (registered trademark) corn" having tolerance to an acetyl COA carboxylase inhibitor (hereinafter abbreviated as "ACCase") such as a trione oxime-type herbicide and an aryloxyphenoxypropionate-type herbicide; for example, sunflower "ExpressSun (registered trademark)" having tolerance to a sulfonylurea-type herbicide such as tribenuron; rice "Rrovisia (trademark) Rice" having tolerance to an acetyl COA carboxylase inhibitor such as quizalofop; canola "Triazine Tolerant Canola" having tolerance to a photosystem II inhibitor.

An example of a plant that is imparted with tolerance to a herbicide by a genome editing technique is canola "SU Canola (registered trademark)" having tolerance to a sulfonylurea-type herbicide and produced by Rapid Trait Development System (RTDS (registered trademark)). RTDS (registered trademark) corresponds to an oligonucleotide-directed mutagenesis employed in a genome editing technique, and is a technique whereby it becomes possible to introduce a mutation into a plant through Gene Repair Oligonucleotide (GRON), i.e., a DNA-RNA chimeric oligonucleotide, without needing to cleave DNA in the plant. Other examples of the plant also include: corn which is reduced in herbicide tolerance and a phytic acid content as the result of the deletion of endogenous gene IPK1 using a zinc finger nuclease (see, for example, Nature 459, 437-441 2009); and rice which is imparted with herbicide tolerance using CRISPR/Cas9 (see, for example, Rice, 7, 5 2014).

The technique imparting tolerance to a herbicide by a new breeding technique includes a breeding technique employing grafting, and as an example of imparting a trait of a GM rootstock to a scion, soybean in which tolerance to glyphosate is imparted to a non-transgenic soybean scion using Roundup Ready (registered trademark) soybean having tolerance to glyphosate as a rootstock (see Weed Technology 27:412-416 2013) can be mentioned.

In the present method, clethodim is usually mixed with a carrier such as a solid carrier and a liquid carrier, and further formulated by addition of an auxiliary agent for formulation such as a surfactant as necessary, to be used.

Preferable formulation types when formulated are soluble liquids, soluble granules, aqueous suspension concentrates, oil-based liquid suspensions, wettable powders, water dispersible granules, granules, aqueous emulsions, oil-based emulsions and emulsifiable concentrates. More preferable formulation types are soluble liquids. A formulation containing clethodim alone as an active ingredient may be independently used or may be tank-mixed with a formulation containing other herbicide as active ingredients. Further, a formulation containing clethodim and other herbicide as active ingredients may be used. Furthermore, a formulation containing clethodim and other herbicide as active ingredients may be tank-mixed with a formulation containing, as active ingredients, herbicides different from the herbicides contained in the former formulation. The content of the active ingredients (clethodim or a total of the clethodim and other herbicides/safeners) in the formulation is usually in a range of 0.01 to 90% by weight, and preferably in a range of 1 to 80% by weight.

Examples of the method for spot treatment of clethodim include a method for spraying clethodim to a soil where weeds are growing or a soil where weeds may grow (soil treatment), and a method of spraying clethodim to growing weeds (foliar treatment). Spraying is usually performed using a spray liquid prepared by mixing a formulation containing clethodim with water. Although the amount of the spray liquid is not particularly limited, inside spot-treated section, it is usually 50 to 1,000 L/ha, preferably 100 to 500 L/ha, and more preferably 140 to 300 L/ha. The proportion of the area subjected to the spot treatment in the cultivation area of the present crop (proportion of the area to which the herbicide is sprayed, relative to the entire area of the continuous cultivation area of the present crop) is usually 1 to 99%, and preferably 10 to 808. Specific examples of the proportion include 20%, 30%, 40%, 50%, 60%, and 70%. The area of the "continuous cultivation area" that defines these percentages is not particularly limited. For example, the proportion treated in a section at a scale of 10,000 m$^2$ may be indicated, and the proportion in a section at any scale such as 1,000 m$^2$, 100 m$^2$, 10 m$^2$, 1 m$^2$, 0.1 m$^2$ and 0.01 m$^2$ may be indicated.

The application amount of clethodim in the present method is 5 to 2,000 g per 10,000 m$^2$, preferably 20 to 500 g per 10,000 m$^2$, more preferably 40 to 200 g per 10,000 m$^2$, and still more preferably 70 to 140 g per 10,000 m$^2$, as the application amount inside spot-treated section. In a case where there is a plurality of sections subjected to spot treatment in a continuous cultivation area, the application amount may be constant or different for each section. When the present method is performed, an adjuvant may be tank-mixed. The type of adjuvant is not particularly limited. Desirably, 0.25%, 0.5%, 1%, 2%, 3%, 4%, 5%, or 6% (volume/volume) of an oil-based adjuvant (Mineral oils such as paraffinic hydrocarbon, naphthenic hydrocarbon or aromatic hydrocarbon and the like, or Methylate Seed Oil obtained by esterifying vegetable oil (soybean oil or rapeseed oil)) such as Agri-Dex or MSO is tank-mixed with the spray liquid; or 0.05%, 0.1%, 0.25%, or 0.5% (volume/volume) of a nonionic adjuvant (polyoxyalkylene alkyl ether, polyoxyalkylene fatty acid ester, alkylaryl alkoxylate, or alkylaryl polyoxyalkylene glycol) such as Induce is tank-mixed with the spray liquid. In addition, examples thereof include anionic adjuvants such as gramine S (substituted sulfonate), cationic adjuvants such as Genamin T 200BM (polyoxyethylene amine), and organic silicon adjuvants such as Silwett L77. Further, a drift reducing agent such as Intact (polyethylene glycol) may be tank-mixed.

The pH and hardness of the spray liquid are not particularly limited, and the pH is usually in a range of 5 to 9, and the hardness is usually in a range of 0 to 500. The time period for performing the present method is not particularly limited, but it is usually in a range of 5 AM to 9 PM, and the photon flux density at the canopy level at the place where the present method is carried out is usually 10 to 2,500 micromole/m$^2$/sec. Meanwhile, the present method can also be carried out at night using the map information and the position information.

The spray pressure when conducting the present method is not particularly limited, but it is usually 30 to 120 PSI and preferably 40 to 80 PSI. Here, the spray pressure is a set value just before introduction into the nozzle.

The nozzle to be used in the present method may be a flat fan nozzle or a drift-reducing nozzle. Examples of the flat fan nozzle include products of Teejet 110 series and XR Teejet 110 series manufactured by Teejet. When these nozzles are used, a spraying pressure is usually 30 to 120 PSI, and the volume median diameter of liquid droplets ejected through each of the nozzles is usually smaller than 430 microns. A drift-reducing nozzle is a nozzle reduced in drift compared with a flat fan nozzle and is called as "air induction nozzle" or "pre-orifice nozzle". The volume median diameter of liquid droplets ejected through the drift-reducing nozzle is usually 430 microns or larger.

An air induction nozzle has an air guide part between an inlet (spray liquid introduction part) of the nozzle and an outlet (spray liquid ejection part) of the nozzle, so that liquid droplets filled with air can be formed upon the mixing the spray liquid with air. Examples of the air induction nozzle include: TDXL11003-D, TDXL11004-D, TDXL11005-D and TDXL11006-D manufactured by Green Leaf Technology; TTI110025, TTI11003, TTI11004, TTI11005, TTI11006 and TTI11008 manufactured by Teejet; and ULD120-041, ULD120-051 and ULD120-061 manufactured by Pentair. A particularly desirable one is TTI11004.

A pre-orifice nozzle is a nozzle in which an inlet (a spray liquid introduction part) of the nozzle serves as a metering orifice, so that large liquid droplets can be formed by controlling the flow amount to be flown into the nozzle so as to decrease the pressure in the nozzle. When this nozzle is used, the pressure during the ejection can be reduced by half compared with the pressure before the introduction. Examples of the pre-orifice nozzle include: DR110-10, UR110-05, UR110-06, UR110-08 and UR110-10 manufactured by Wilger; and 1/4TTJ08 Turf Jet and 1/4TTJ04 Turf Jet manufactured by Teejet.

In the present method, seeds of the present crop are seeded in the cultivation area by a normal method. The present method may be performed before seeding, or the present method may be performed simultaneously with seeding and/or after seeding. That is, examples of the number of times of performing the present method include 1 to 3 during the cultivation of the present crop. In the case of 1, the treatment can be performed 1 time before seeding, 1 time simultaneously with seeding, or 1 time after seeding. In the case of 2, the treatment can be performed 2 times except before seeding, 2 times except simultaneously with seeding, or 2 times except after seeding. In the case of 3, the treatment can be performed 1 time before seeding, 1 time simultaneously with seeding, and 1 time after seeding.

When the present method is performed before seeding, the present method is usually performed 50 days before seeding to immediately before seeding, preferably 30 days before seeding to immediately before seeding, more preferably 20 days before seeding to immediately before seeding, and still more preferably 10 days before seeding to immediately before seeding.

When the present method is performed after seeding, the present method is usually performed immediately after seeding to before flowering. A more preferable performing time is between immediately after seeding and before emergence, and between the 1 leaf stage and the 6 leaf stage of the true leaf of the present crop.

The case where the present method is performed simultaneously with seeding is a case where the seeding machine and the sprayer are integrated.

In the present method, when the present crop is cultivated, the seed of the crop may be treated with one or more compound selected from the group consisting of a specific insecticide compound, a nematicide compound, a fungicide compound, and a plant growth regulator compound. Examples of compounds used for seed treatment include neonicotinoid compounds, diamide compounds, carbamate compounds, organophosphorus compounds, biological nematicide compounds, other insecticide compounds and nematicide compounds, azole compounds, strobilurin compounds, metalaxyl compounds, SDHI compounds, other fungicide compounds, and plant growth regulator compounds.

Examples of weed species to be controlled by the present method include, but are not limited to, the followings.

Poaceae weeds: common barnyardgrass (*Echinochloa crus-galli*), early barnyardgrass (*Echinochloa oryzicola*), barnyard grass (*Echinochloa crus-galli* var *formosensis*), late watergrass (*Echinochloa oryzoides*), jungle rice (*Echinochloa colonum*), Gulf cockspur (*Echinochloa crus-pavonis*), green foxtail (*Setaria viridis*), giant foxtail (*Setaria faberi*), yellow foxtail (*Setaria glauca*), knotroot foxtail (*Setaria geniculata*), southern crabgrass (*Digitaria ciliaris*), large crabgrass (*Digitaria sanguinalis*), Jamaican crabgrass (*Digitaria horizontalis*), sourgrass (*Digitaria insularis*), goosegrass (*Eleusine indica*), annual bluegrass (*Poa annua*), rough-stalked meadowgrass (*Poa trivialis*), Kentucky bluegrass (*Poa pratensis*), short-awn foxtail (*Alopecurus aequalis*), blackgrass (*Alopecurus myosuroides*), wild oat (*Avena fatua*), Johnsongrass (*Sorghum halepense*), shatter cane (*Sorghum vulgare*), quackgrass (*Agropyron repens*), Italian ryegrass (*Lolium multiflorum*), perennial ryegrass (*Lolium perenne*), bomugi (*Lolium rigidum*), rescue brome (*Bromus catharticus*), downy brome (*Bromus sterilis*), Japanese brome grass (*Bromus japonicus*), cheat (*Bromus secalinus*), cheatgrass (*Bromus tectorum*), foxtail barley (*Hordeum jubatum*), jointed goatgrass (*Aegilops cylindrica*), reed canarygrass (*Phalaris arundinacea*), little-seed canary grass (*Phalaris minor*), silky bentgrass (*Apera spica-venti*), fall panicum (*Panicum dichotomiflorum*), Texas panicum (*Panicum texanum*), guineagrass (*Panicum maximum*), broadleaf signalgrass (*Brachiaria platyphylla*), Congo signal grass (*Brachiaria ruziziensis*), Alexander grass (*Brachiaria plantaginea*), Surinam grass (*Brachiaria decumbens*), palisade grass (*Brachiaria brizantha*), creeping signalgrass (*Brachiaria humidicola*), southern sandbur (*Cenchrus echinatus*), field sandbur (*Cenchrus pauciflorus*), woolly cupgrass (*Eriochloa villosa*), feathery pennisetum (*Pennisetum setosum*), Rhodes grass (*Chloris gayana*), feathertop Rhodes grass (*Chloris virgata*), India lovegrass (*Eragrostis pilosa*), Natal grass (*Rhynchelytrum repens*), crowfoot grass (*Dactyloctenium aegyptium*), winkle grass (*Ischaemum rugosum*), swamp millet (*Isachne globosa*), common rice (*Oryza sativa*), bahiagrass (*Paspalum notatum*), coastal sand paspalum (*Paspalum maritimum*), mercergrass (*Paspalum distichum*), kikuyugrass (*Pennisetum clandestinum*), West Indies *pennisetum* (*Pennisetum setosum*), itch grass (*Rottboellia cochinchinensis*), Asian sprangletop (*Leptochloa chinensis*), salt-meadow grass (*Leptochloa fascicularis*), Christmas-tree grass (*Leptochloa filiformis*), Amazon sprangletop (*Leptochloa panicoides*), Japanese cutgrass (*Leersia japonica*), *Leersia sayanuka*, cutgrass (*Leersia oryzoides*), *Glyceria leptorrhiza*, sharpscale mannagrass (*Glyceria acutiflora*), great watergrass (*Glyceria maxima*), redtop (*Agrostis gigantea*), carpet bent (*Agrostis stolonifera*), Bermuda grass (*Cynodon dactylon*), cocksfoot (*Dactylis glomerata*), centipede grass (Eremochloa ophiuroides), tall fescue (*Festuca arundinacea*), red fescue (*Festuca rubra*), lalang (*Imperata cylindrica*), Chinese fairy grass (*Miscanthus sinensis*), switchgrass (*Panicum virgatum*), Japanese lawngrass (*Zoysia japonica*), volunteer corn (*Zea mays* L.). Volunteer corn is corn which has germinated from corn seeds that fell on a cultivation area without being harvested when corn is cultivated before cultivating the present crop, and is regarded as a weed in the cultivation of the present crop. The cultivated corn as the source may be of any maturity group such as early maturing variety to late maturing variety, and it is extremely common that the corn is dent corn, but may be flint corn, soft corn, popcorn, waxy corn, sweet corn and the like. It is also extremely common that the corn is field corn which is a complex mainly composed of dent corn and flint corn or hybrids thereof. For example, WO 2020017667, U.S. Pat. Nos. 6,239,072, 8,748, 700 and the like disclose the method for controlling volunteer corn with clethodim, but these patent documents do not disclose control by a spot treatment.

In the above weeds, intra-specific variations are not particularly limited. Namely, the weeds also include any weeds that have reduced sensitivity (also referred to "have resistance") to a specific herbicide. The reduced sensitivity may be attributed to a mutation at a target site (target site mutation), or may be attributed to any factors other than target site mutation (non-target site mutation). Target site mutation include those in which the substitution of amino acid residue of a protein as a target site occurred due to mutation of an open reading frame corresponding to amino acid sequence of the protein, and those in which the protein as the target site is overexpressed due to mutation such as deletion of the suppressor sequence in the promoter region, amplification of the enhancer sequence, or increase in the number of copies of gene.

Examples of the factor reducing sensitivity due to non-target site mutation include metabolic enhancement, defective absorption, defective transition, extrusion and the like. Examples of the factor of the metabolic enhancement includes enhanced activity of metabolic enzymes such as cytochrome P450 monooxygenases, aryl acylamidases, esterases and glutathione S-transferase. The extrusion includes the transportation to a vacuole by an ABC transporter.

Examples of herbicide-resistant weeds include followings.

Resistance to Glyphosate:

Examples of the reduced sensitivity of weeds due to target site mutation include weeds in which the substitution of any one amino acid residue or multiple amino acid residues selected from the below-mentioned amino acid residues occurs in EPSPS gene. Thr102Ile, Pro106Ser, Pro106Ala and Pro106Leu. According to the present invention, goosegrass (*Eleusine indica*), Italian ryegrass (*Lolium multiflorum*), rigid ryegrass (*Lolium rigidum*), sourgrass (*Digitaria insularis*), jungle rice (*Echinochloa colona*) and the like each having one mutation or multiple mutations (e.g., double mutation of Thr102Ile and Pro106Ser) are controlled effectively. Similarly, examples of the resistance to glyphosate due to target site mutation include those in which the number of copies of EPSPS gene is increased.

Resistance to ALS-Inhibition-Type Herbicides:

Examples of the reduced sensitivity of weeds due to target site mutation include weeds each having a mutation capable of causing the substitution of one amino acid residue or multiple amino acid residues selected from the below-mentioned amino acid residues in ALS gene as a target site mutation. Ala122Thr, Ala122Val, Ala122Tyr, Pro197Ser, Pro197His, Pro197Thr, Pro197Arg, Pro197Leu, Pro197Gln, Pro197Ala, Pro197Ile, Ala205Val, Ala205Phe, Asp376Glu, Asp376Gln, Asp376Asn, Arg377His, Trp574Leu, Trp574Gly, Trp574Met, Ser653Thr, Ser653Asn, Ser635Ile, Gly654Glu and Gly654Asp. According to the present invention, ALS inhibitor-resistant barnyardgrass (*Echinochloa crus-galli*), giant foxtail (*Setaria faberi*.), green foxtail (*Setaria viridis*), Johnson grass (*Sorghum halepense*), swiss ryegrass (*Lolium rigidum* Gaud), Italian ryegrass (*Lolium multiflorum*), blackgrass (*Alopecurus myosuroides* Huds), wild oats (*Avena fatua*) and the like each having the target site mutation can be controlled effectively. Examples of the reduced sensitivity of weeds due to non-target site mutation include weeds each having such a non-target site mutation that CYP or GST is involved to make the weed resistant to an ALS inhibitor, and these weeds can also be controlled effectively according to the present invention. There have been known, as examples of the weeds, rigid ryegrass (*Lolium rigidum*) in which CYP81A10 and CYP81A1v1 are overexpressed, rice barnyardgrass (*Echinochloa oryzoides*) in which CYP81A12 and CYP81A21 are overexpressed, and blackgrass (*Alopecurus myosuroides* Huds) in which GSTF1 and GSTU2 are overexpressed. Resistance to ACCase inhibitors:

Examples of the reduced sensitivity of weeds due to target site mutation include weeds each having a mutation capable of causing the substitution of one amino acid residue or multiple amino acid residues in ACCase gene. Ile1781Leu, Ile1781Val, Ile1781Thr, Trp1999Cys, Trp1999Leu, Ala2004Val, Trp2027Cys, Ile2041Asn, Ile2041Val, Asp2078Gly, Cys2088Arg and Gly2096Ala. According to the present invention, ACCase-resistant weeds having these target site mutations are effectively controlled. Examples of the reduced sensitivity of weeds due to non-target site mutation include weeds each of which becomes resistant to an ACCase inhibitor as the result of the involvement of CYP or GST. There have been known, as examples of the weeds, rigid ryegrass (*Lolium rigidum*) in which CYP81A10 and CYP81A1v1 are overexpressed, rice barnyardgrass (*Echinochloa oryzoides*) in which CYP81A12 and CYP81A21 are overexpressed, and blackgrass (*Alopecurus myosuroides* Huds) in which GSTF1 and GSTU2 are overexpressed. The resistance to ACCase inhibitors in this case means resistance to ACCase inhibitors other than clethodim.

Resistance to PPO Inhibitors:

Examples of the reduced sensitivity of weeds due to target site mutation include weeds each having a mutation capable of causing the substitution of one amino acid residue or multiple amino acid residues in PPO gene. These mutations are known as fomesafen- and lactofen-resistance mutations. Arg128Leu, Arg128Met, Arg128Gly, Arg128His, Gly210 deficit, Ala210Thr, Gly114Glu, Ser149Ile and Gly399Ala. Usually, PPO genes in a weed includes PPO1 gene and PPO2 gene. The above-mentioned mutation may occur in either one or both of PPO1 gene and PPO2 gene. It is preferred that the mutation occurs in PPO2 gene. For example, Arg128Met means that a mutation occurs in an amino acid residue located at position-128 (the number is standardized by PPO2 of palmer amaranth (*Amaranthus palmeri*)). In PPO2 gene of common ragweed (*Ambrosia artemisiaefolia*), the mutation corresponds to position-98 (Weed Science 60, 335-344) and is known as Arg98Leu, and this Arg98 is the same as Arg128 in the present specification. For example, goosegrass (*Eleusine indica*) with the Ala210Thr mutation in PPO1 is known, and is effectively controlled by the present invention.

Resistance to Photosystem II Inhibitors:

Examples of the reduced sensitivity of weeds due to target site mutation include weeds each having a mutation capable of causing the substitution of one amino acid residue or multiple amino acid residues selected from the below-mentioned amino acid residues in psbA gene. Val219Ile, Ser264Gly, Ser264Ala, Phe274Val. According to the present invention, photosystem II inhibitor-resistant foxtail grass (*Setaria faberi*) having this target site mutation can be controlled effectively. As the case of the reduced sensitivity of weeds due to non-target site mutation, weeds tolerant to photosystem II inhibitor and the like each of which becomes resistant to a photosystem II inhibitor as the result of the involvement of CYP, GST or AAA are known. These weeds can be effectively controlled according to the present invention. As an example thereof, swiss ryegrass (*Lolium rigidum* Gaud) in which CYP71R4 are overexpressed, and barnyardgrass (*Echinochloa crus-galli*) which becomes resistant to propanyl by AAA are known.

Resistance to Glutamate Synthase Inhibitors:

As the case of reduced sensitivity of weeds due to target site mutation, glufosinate-tolerant perennial ryegrass (*Lolium perenne*) having a mutation capable of causing the amino acid substitution of Asp171Asn in a glutamate synthase gene is known, but is effectively controlled by the present invention. Goosegrass (*Eleusine indica*) which became resistant to glufosinate due to unknown factors is also effectively controlled.

Resistant weeds each having a "combination (stack)" of at least two groups selected from the above-mentioned groups (arbitrarily selected two groups, arbitrarily selected three groups, arbitrarily selected four groups, arbitrarily selected five groups, arbitrarily selected six groups or arbitrarily selected seven groups) can also be controlled effectively. The stack may be a combination of target site mutations or a combination of non-target site mutations, or a combination of a target site mutation and a non-target site mutation.

In the present method, clethodim may be used in combination with one or more other herbicides, plant growth regulators, and safeners. Here, the "use in combination" includes tank-mix, pre-mix, and sequential application, and the sequential order in the case of sequential application is not particularly limited.

Examples of the herbicide, plant growth regulator and safener which can be used in combination with clethodim include the followings.

Herbicides: 2,3,6-TBA (2,3,6-trichlorobenzoic acid), 2,3, 6-TBA-dimethylammonium, 2,3,6-TBA-lithium, 2,3,6-TBA-potassium, 2,3,6-TBA-sodium, 2,4-DB, 2,4-DB choline salt, 2,4-DB biproamine, 2,4-DB-butyl, 2,4-DB-dimethylammonium, 2,4-DB-isoctyl, 2,4-DB-potassium, 2,4-DB-sodium, acetochlor, acifluorfen, acifluorfen-sodium, aclonifen, ACN (2-amino-3-chloronaphthalene-1,4-dione), alachlor, allidochlor, alloxydim, ametryn, amicarbazone, amidosulfuron, aminocyclopyrachlor, aminocyclopyrachlor-methyl, aminocyclopyrachlor-potassium, aminopyralid, aminopyralid choline salt, aminopyralid-potassium, amino-pyralid-tripromine, amiprophos-methyl, amitrole, anilofos, asulam, atrazine, azafenidin, azimsulfuron, beflubutamid, benazolin-ethyl, bencarbazone, benfluralin, benfuresate, bensulfuron, bensulfuron-methyl, bensulide, bentazon, benthiocarb, benzfendizone, benzobicyclon, benzofenap, benzthiazuron, bialafosbialaphos, bicyclopyrone, bifenox, bispyribac, bispyribac-sodium, bixlozone, bromacil, bromobutide, bromofenoxim, bromoxynil, bromoxynil-octanoate, butachlor, butafenacil, butamifos, butralin, butroxydim, butylate, cafenstrole, carbetamide, carfentrazone, carfentrazone-ethyl, chlomethoxyfen, chloramben, chloridazon, chlorimuron, chlorimuron-ethyl, chlorobromuron, chlorotoluron, chloroxuron, chlorpropham, chlorsulfuron, chlorthal-dimethyl, chlorthiamid, cinidon, cinidon-ethyl, cinmethylin, cinosulfuron, clodinafop, clodinafop-propargyl, clomazone, clomeprop, clopyralid, clopyralid choline salt, clopyralid-methyl, clopyralid-olamine, clopyralid-potassium, clopyralid-tris (2-hydroxypropyl) ammonium, cloransulam, cloransulam-methyl, cumyluron, cyanazine, cyclopyranil, cycloate, cyclopyrimorate, cyclosulfamuron, cycloxydim, cyhalofop, cyhalofop-butyl, daimuron, dalapon, dazomet, desmedipham, desmetryn, diallate, dichlobenil, dichlorprop, dichlorprop choline salt, dichlorprop-biproamine, dichlorprop-2-ethylhexyl, dichlorprop-butotyl, dichlorprop-dimethylammonium, dichlorprop-ethylammonium, dichlorprop-isoctyl, dichlorprop-methyl, dichlorprop-P, dichlorprop-P choline salt, dichlorprop-P-biproamine, dichlorprop-P-2-ethylhexyl, dichlorprop-P-dimethylammonium, dichlorprop-potassium, dichlorprop-sodium, diclofop, diclofop-methyl, diclosulam, difenoxuron, difenzoquat, difenzoquat metilsulfate, diflufenican, diflufenzopyr, diflufenzopyr-sodium, dimefuron, dimepiperate, dimethachlor, dimethametryn, dimethenamid, dimethenamide-P, dimepiperate, dinitramine, dinoseb, dinoterb, diphenamid, diquat, diquat-dibromide, DSMA (disodium methylarsonate), dithiopyr, diuron, DNOC (2-methyl-4,6-dinitrophenol), esprocarb, ethalfluralin, ethametsulfuron, ethametsulfuron-methyl, ethidimuron, ethofumesate, ethoxyfen-ethyl, ethoxysulfuron, etobenzanid, fenoxaprop, fenoxaprop-ethyl, fenoxaprop-P, fenoxaprop-P-ethyl, fenoxasulfone, fenquinotrione, fentrazamide, fenuron, flamprop-M, flazasulfuron, florasulam, florpyrauxifen, florpyrauxifen-benzyl, fluazifop, fluazifop-butyl, fluazifop-P, fluazifop-P-butyl, fluazolate, flucarbazone, flucarbazone-sodium, flucetosulfuron, flufenacet, flufenpyr, flufenpyr-ethyl, flumetsulam, flumetsulam, flumiclorac, flumiclorac-pentyl, flumioxazin, fluometuron, fluoroglycofen-ethyl, flupoxam, flupropanate, flupyrsulfuron, flupyrsulfuron-methyl-sodium, flurenol, fluridone, flurochloridone, fluroxypyr, fluroxypyr-butometyl, fluroxypyr-meptyl, fluroxypyr-butomethl, flurtamone, fluthiacet, fluthiacet-methyl, fomesafen, fomesafen-sodium, foramsulfuron, fosamine, halauxifen, halauxifen-methyl, halosafen, halosulfuron, halosulfuron-methyl, haloxyfop, haloxyfop-etotyl, haloxyfop-methyl, haloxyfop-P, haloxyfop-P-etotyl, haloxyfop-P-methyl, hexazinone, imazamethabenz, imazamethabenz-methyl, imazamox, imazamox-ammonium, imazapic, imazapic-ammonium, imazapyr, imazapyr-isopropylammonium, imazaquin, imazaquin-ammonium, imazosulfuron, indanofan, indaziflam, iodosulfuron, iodosulfuron-methyl-sodium, iofensulfuron, iofensulfuron-sodium, ioxynil, ioxynil-octanoate, ipfencarbazone, isoproturon, isouron, isoxaben, isoxachlortole, isoxaflutole, lactofen, lenacil, linuron, maleic hydrazide, MCPA (2-(4-chloro-2-methylphenoxy) acetic acid), MCPA choline salt, MCPA-biproamine, MCPA-etexyl, MCPA-butotyl, MCPA-butyl, MCPA-dimethylammonium, MCPA-diolamine, MCPA-ethyl, MCPA-isobutyl, MCPA-isoctyl, MCPA-isopropyl, MCPA-methyl, MCPA-olamine, MCPA-sodium, MCPA-trolamine, MCPB (4-(4-chloro-2-methylphenoxy) butanoic acid), MCPB choline salt, MCPB-biproamine, MCPB-ethyl, MCPB-methyl, MCPB-sodium, mecoprop, mecoprop choline salt, mecoprop-biproamine, mecoprop-2-ethylhexyl, mecoprop-dimethylammonium, mecoprop-diolamine, mecoprop-ethadyl, mecoprop-isoctyl, mecoprop-methyl, mecoprop-potassium, mecoprop-sodium, mecoprop-trolamine, mecoprop-P, mecoprop-P choline salt, mecoprop-P-2-ethylhexyl, mecoprop-P-dimethylammonium, mecoprop-P-isobutyl, mecoprop-P-potassium, mefenacet, mesosulfuron, mesosulfuron-methyl, mesotrione, metam, metamifop, metamitron, metazachlor, metazosulfuron, methabenzthiazuron, methiozolin, methyldymron, metobromuron, metolachlor, metosulam, metoxuron, metribuzin, metsulfuron, metsulfuron-methyl, molinate, monolinuron, naproanilide, napropamide, napropamide-M, naptalam, neburon, nicosulfuron, norflurazon, oleic acid, orbencarb, orthosulfamuron, oryzalin, oxadiargyl, oxadiazon, oxasulfuron, oxaziclomefone, oxyfluorfen, paraquat, paraquat-dichloride, pebulate, pelargonic acid, pendimethalin, penoxsulam, pentanochlor, pentoxazone, pethoxamid, phenisopham, phenmedipham, picloram, picolinafen, pinoxaden, piperophos, pretilachlor, primisulfuron, primisulfuron-methyl, prodiamine, profluazol, profoxydim, prometon, prometryn, propachlor, propanil, propaquizafop, propazine, propham, propisochlor, propoxycarbazone, propoxycarbazone-sodium, propyrisulfuron, propyzamide, prosulfocarb, prosulfuron, pyraclonil, pyraflufen-ethyl, pyrasulfotole, pyrazolynate, pyrazosulfuron, pyrazosulfuron-ethyl, pyrazoxyfen, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quizalofop, quizalofop-ethyl, quizalofop-tefuryl, quizalofop-P, quizalofop-P-ethyl, quizalofop-P-tefuryl, rimsulfuron, saflufenacil, sethoxydim, EPIC (S-ethyl N, N-dipropylcarbamothioate), siduron, simazine, simetryn, S-metolachlor, MSMA (sodium hydrogen methylarsonate), sulcotrione, sulfentrazone, sulfometuron, sulfometuron-methyl, TCA-ethadyl, sulfosulfuron, swep, TCA (2,2,2-trichloroacetic acid), tebutam, tebuthiuron, tefuryltrione, tembotrione, tepraloxydim, terbacil, terbumeton, terbuthylazine, terbutryn, tetflupyrolimet, thaxtomin A, thenylchlor, thiazopyr, thidiazimin, thiencarbazone, thiencarbazone-methyl, thifensulfuron, thifensulfuron-methyl, tiafenacil, tiocarbazil, tolpyralate, topramezone, tralkoxydim, triafamone, tri-allate, triasulfuron, triaziflam, tribenuron, tribenuron-methyl, triclopyr, triclopyr-butotyl, triclopyr-ethyl, triclopyr-triethylammonium, tridiphane, trietazine, trifloxysulfuron, trifloxysulfuron-sodium, trifludimoxazin, trifluralin, triflusulfuron, triflusulfuron-methyl, tritosulfuron, vernolate, ethyl [3-[2-chloro-4-fluoro-5-(1-methyl-6-trifluoromethyl-2,4-dioxo-1, 2, 3, 4-tetrahydropyrimidin-3-yl) phenoxy]-2-pyridyloxyacetate, glyphosate choline salt, glyphosate isopropylamine salt, glyphosate-biproamine, glyphosate-ammonium, glyphosate-diammonium, glyphosate-potassium, glyphosate-sodium, glyphosate-trimesium, glyphosate-dimethylammonium, glyphosate-monoethanolamine, glufosinate-ammonium, glufosinate-P-ammonium, glufosinate-sodium, glufosinate-P-sodium, dicamba-diglycolamine, dicamba-biproamine, dicamba-tetrabutylammonium, dicamba-tetrabutylphosphonium, 2,4-D choline salt, 2,4-D-biproamine, 2,4-D-doboxyl, 2,4-D-2-ethylhexyl, 2,4-D-3-butoxypropyl, 2,4-D-ammonium, 2,4-D-butotyl, 2,4-D-butyl, 2,4-D-diethylammonium, 2,4-D-dimethylammonium, 2,4-D-diolamine, 2,4-D-dodecylammonium, 2,4-D-ethyl, 2,4-D-heptylammonium, 2,4-D- isobutyl, 2,4-D-isooctyl, 2,4-D-isopropyl, 2,4-D-isopropylammonium, 2,4-D-lithium, 2,4-D-meptyl, 2,4-D-methyl, 2,4-D-octyl, 2,4-D-pentyl, 2,4-D-propyl, 2,4-D-sodium, 2,4-D-tefuryl, 2,4-D-tetradecylammonium, 2,4-D-triethylammonium, 2,4-D-tris(2-hydroxypropyl) ammonium, 2,4-D-trolamine, and imazethapyr-ammonium.

Safener: benoxacor, cloquintocet, cloquintocet-mexyl, cyometrinil, cyprosulfamide, dichlormid, dicyclonone, disulfoton, daimuron, fenchlorazole, fenchlorazole-ethyl, fenclorim, flurazole, furilazole, fluxofenim, hexim, isoxadifen, isoxadifen-ethyl, mefenpyr, mefenpyr-ethyl, mefenpyr-diethyl, mephenate, metcamifen, and oxabetrinil.

As the herbicide which can be used in combination with clethodim in the present method, flumioxazin, pyroxasulfone, acetochlor, mesotrione, isoxaflutole, chlorimuron-ethyl, metribuzin, dimethenamide-P, pendimethalin, ethyl [3-[2-chloro-4-fluoro-5-(1-methyl-6-trifluoromethyl-2,4-dioxo-1, 2, 3, 4-tetrahydropyrimidin-3-yl) phenoxy]-2-pyridyloxylacetate, glyphosate-potassium, glufosinate-ammonium, imazethapyr-ammonium, dicamba-biproamine, dicamba-diglycolamine, 2,4-D choline salt, and 2,4-D-2-ethylhexyl are particularly preferable.

In the present method, as the safener which can be used in combination with clethodim, cyprosulfamide, benoxacor, dichlormid, furilazole, and isoxadifen-ethyl are particularly preferable.

When the herbicide and/or safener mentioned above are used in combination with clethodim, the weight ratio of clethodim to the other herbicide and/or safener is usually in a range of 1:0.001 to 1:100, preferably in a range of 1:0.01 to 1:10, and more preferably in a range of 1:0.1 to 1:5. Examples of specific weight ratios include 1:0.02, 1:0.04, 1:0.06, 1:0.08, 1:0.2, 1:0.4, 1:0.6, 1:0.8, 1:1, 1:1.5, 1:2, 1:2.5, 1:3, 1:4, 1:7, 1:8, 1:12, 1:15, 1:20, 1:30, 1:40, 1:50, 1:60, 1:70, and 1:80. These weight ratios may be described with approximately. Approximately means plus/minus 10%, so, for example, "approximately 1:2" means 1:1.8 to 1:2.2.

The cultivation of the present crops in the present invention can be managed according to the plant-nutrition management in the common crop cultivation. The fertilization system may be based on Precision Agriculture or may be conventionally uniform one. In addition, nitrogen fixation bacteria and mycorrhizal fungi may be inoculated by seed treatment.

EXAMPLES

Hereinbelow, the present invention will be described in more detail by way of Examples. However, the present invention is not limited by these Examples.

At first, criteria for the evaluation of the herbicidal effect and the harmful effect on crops shown in the below-mentioned examples will be described.

[Herbicidal Effect and Harmful Effect on Crops]

The herbicidal effect was rated within a range of 0 to 100, wherein "0" was a rating where the state of emergence or growth of a sample weed during a test had no difference or little difference compared with the state of the test weed that did not subjected to the treatment, and "100" was a rating where the test plant was completely killed or the emergence or growth of the test weed was completely suppressed.

The harmful effect on crops was rated as "harmless" when little harmful effect was observed, "low" when a moderate level of harmful effect was observed, "medium" when a medium level of harmful effect was observed, and "high" when a high level of harmful effect was observed.

Example 1

A pot is filled with a soil, and then barnyardgrass (*Echinochloa crus-galli*), sourgrass (*Digitaria insularis*), foxtail grass (*Setaria faberi*), Johnsongrass (*Sorghum halepense*), or corn (*Zea mays* L.) (supposed to be volunteer corn) is seeded at a corner portion of the soil. The weeds are grown in a greenhouse for 14 days, and a section including vegetation patches of weeds (20% of the area on the pot) is foliar-treated with a spray liquid of clethodim (prepared by diluting a commercially available formulation of clethodim (emulsifiable concentrate containing 120 g/L of clethodim, Select Max, manufactured by Valent USA) with water containing 1% (w/v) of Adjuvant Agri-Dex) at 100 g/ha (shown as an application amount of clethodim in a spot-treated section) on a spray volume of 150 L/ha (as a spray volume in a spot-treated section). Immediately thereafter, soybean (Genuity Roundup Ready 2 Xtend), sugar beet, rapeseed, sunflower, or cotton (Genuity Roundup Ready 2 Xtend) is seeded in a corner portion different from vegetation patches of weeds in the soil, and grown in the greenhouse for 21 days. This is defined as the invention plot. An excellent weed control effect is confirmed in the invention plot compared with the comparative plot different from the invention plot in that soybean, sugar beet, rapeseed, sunflower, or cotton are not seeded, and the comparative plot different from the invention plot in that uniform blanket treatment is performed on the entire pot at 100 g/ha.

Example 2

A pot is filled with a soil, and then barnyardgrass (*Echinochloa crus-galli*), sourgrass (*Digitaria insularis*), foxtail grass (*Setaria faberi*), Johnsongrass (*Sorghum halepense*), or corn (*Zea mays* L.) (supposed to be volunteer corn) is seeded at a corner portion of the soil, and soybean (Genuity Roundup Ready 2 Xtend), sugar beet, rapeseed, sunflower, or cotton (Genuity Roundup Ready 2 Xtend) is seeded in another corner portion in the soil. The weeds and crops are grown in a greenhouse for 14 days, and a section including vegetation patches of weeds (20% of the area on the pot) is foliar-treated with a spray liquid of clethodim (prepared by diluting a commercially available formulation of clethodim (emulsifiable concentrate containing 120 g/L of clethodim, Select Max, manufactured by Valent USA) with water containing 1% (w/v) of Adjuvant Agri-Dex) at 70 g/ha (shown as an application amount of clethodim in a spot-treated section) on a spray volume of 200 L/ha (as a spray volume in a spot-treated section). Thereafter, the crops are grown in the greenhouse for 21 days. This is defined as the invention plot. An excellent weed control effect is confirmed in the invention plot compared with the comparative plot different from the invention plot in that soybean, sugar beet, rapeseed, sunflower, or cotton are not seeded, and the comparative plot different from the invention plot in that uniform blanket treatment is performed on the entire pot at 70 g/ha.

Reference Example (Conventional Method)

Soybeans for harvesting dry-ripened seeds (Asgrow 3832: indeterminate growth habit, Genuity Roundup Ready 2 Yield, or NA5909RG: indeterminate growth habit, Roundup Ready) are seeded and grown in an agricultural field where field corns (P30F53, P30F53RR, P30F53YHV, DKB390, DKB390IPRO3, DKC62-08, DKC35-88RIB RR2 BT, P7958AM RR2 LL BT, NK1120-3122 RR+GLU+ECB+ CRW, P9608AM LL RR2 CRW ECB, MY10Z29 Enlist SmartStax, or field corns having PPO-tolerant genes mentioned in WO2020017667) have been cultivated in the preceding crop. In the V3 stage of soybean, a uniform blanket treatment of clethodim is performed in the entire agricultural field where volunteer corns derived from unharvested seeds of the field corns of the preceding crop have emerged. Specifically, a predetermined amount of a commercially available formulation of clethodim (emulsifiable concentrate containing 120 g/L of clethodim, Select Max, manufactured by Valent USA) is diluted with water containing 0.5% (v/v) of Agridex as an adjuvant to prepare a spray liquid, and then the spray liquid is sprayed by a boom sprayer running on the ground. The spray volume in the application of clethodim is 150 liters/hectare, and the application amount of clethodim is 70, 100 or 140 g/hectare. Thereafter, it is confirmed that there are almost no volunteer corn in the entire agricultural field in the soybean grain-filling stage.

Example 3

Soybeans for harvesting dry-ripened seeds (Asgrow 3832: indeterminate growth habit, Genuity Roundup Ready 2 Yield, or NA5909RG: indeterminate growth habit, Roundup Ready) are seeded and grown in an agricultural field where field corns (P30F53, P30F53RR, P30F53YHV, DKB390, DKB390IPRO3, DKC62-08, DKC35-88RIB RR2 BT, P7958AM RR2 LL BT, NK1120-3122 RR+GLU+ECB+ CRW, P9608AM LL RR2 CRW ECB, MY10Z29 Enlist SmartStax, or field corns having PPO-tolerant genes mentioned in WO2020017667) have been cultivated in the preceding crop. In the V3 stage of soybean, a spot treatment of clethodim is performed in the agricultural field where volunteer corns derived from unharvested seeds of the field corns of the preceding crop have emerged. Specifically, a predetermined amount of a commercially available formulation of clethodim (emulsifiable concentrate containing 120 g/L of clethodim, Select Max, manufactured by Valent USA) is diluted with water containing 0.5% (v/v) of Agridex as an adjuvant to prepare a spray liquid, and then the spray liquid is sprayed by a boom sprayer for spot treatment (John Deere 400 series equipped with See & Spray Select) running on the ground. The spray volume in the application of clethodim is 150 liters/hectare in a spot-treated section, and the application amount of clethodim is 70, 100 or 140 g/hectare in a spot-treated section.

INDUSTRIAL APPLICABILITY

Weeds can be effectively controlled by the method for controlling weeds of the present invention.

The invention claimed is:

1. A method for controlling weeds, the method comprising:
   performing a spot treatment with clethodim by a sprayer in a cultivation area of soybean, wherein the weeds is volunteer corn, and wherein the sprayer is not hand-held, and an application amount of clethodim is from 20 to 500 g per 10,000 m² as the application amount inside a spot-treated section,
   wherein a proportion of an area subjected to the spot treatment in the cultivation area of soybean, which is a proportion of the area to which clethodim is sprayed relative to an entire area of a continuous cultivation area of soybean, is from 1% to 99%.

2. The method according to claim 1, wherein clethodim is applied to at least 10% of an area of the cultivation by the spot treatment.

3. The method according to claim 1, wherein the cultivation area comprises a place where soybean is cultivated or a place where soybean is to be cultivated.

4. The method according to claim 1, wherein the spot treatment comprises selectively spraying clethodim on places where weeds are growing or may grow.

5. The method according to claim 1, wherein clethodim is comprised in a formulation.

6. The method according to claim 5, wherein clethodim is mixed with a carrier in the formulation.

7. The method according to claim 6, wherein the carrier is a solid carrier or a liquid carrier.

8. The method according to claim 5, wherein the formulation further comprises a surfactant.

9. The method according to claim 5, wherein the formulation further comprises at least one other herbicide.

10. The method according to claim 5, wherein the formulation comprises from 0.01 wt % to 90 wt % of clethodim.

11. The method according to claim 9, wherein the formulation comprises from 0.01 wt % to 90 wt % of a total of clethodim and the at least one other herbicide.

12. The method according to claim 1, wherein the proportion of the area subjected to the spot treatment in the cultivation area of soybean is from 10% to 80%.

13. The method according to claim 5, wherein from 0.12% to 6% volume/volume of an oil-based adjuvant is added to the formulation.

14. The method according to claim 5, wherein the formulation is in a form of a spray liquid having a pH of from 5 to 9, and a hardness of from 0 to 500.

15. The method according to claim 1, wherein the spot treatment comprises applying clethodim in a form of a spray liquid in combination with another herbicide, a plant growth regulator, and a safener.

* * * * *